United States Patent [19]

Zerver

[11] Patent Number: 4,466,628
[45] Date of Patent: Aug. 21, 1984

[54] MOBILE CONTAINER

[75] Inventor: Alfred Zerver, Remscheid, Fed. Rep. of Germany

[73] Assignee: Hazet-Werk Hermann Zerver GmbH & Co. K.G., Remscheid, Fed. Rep. of Germany

[21] Appl. No.: 325,622

[22] Filed: Nov. 30, 1981

[30] Foreign Application Priority Data

Dec. 5, 1980 [DE] Fed. Rep. of Germany ....... 3045905

[51] Int. Cl.³ .............................................. B25H 5/00
[52] U.S. Cl. .................................. 280/47.35; 108/144; 280/79.1 R
[58] Field of Search ................. 280/79.1 A, 47.35, 35, 280/638, 114, 127, 130, 79.1 R, 79.2, 79.3, 659; 211/133, 187, 207; 108/244; 312/237, 246, 247, 250, 312

[56] References Cited

U.S. PATENT DOCUMENTS

| 1,660,521 | 2/1928 | Nordgren | 280/47.35 |
| 2,819,938 | 1/1958 | Zerver | 280/79.3 |
| 3,834,725 | 10/1974 | Luoni | 280/79.2 |
| 4,338,987 | 7/1982 | Miles | 312/247 |

FOREIGN PATENT DOCUMENTS

| 955219 | 12/1956 | Fed. Rep. of Germany | 280/79.3 |
| 1942100 | 5/1966 | Fed. Rep. of Germany | |
| 2115809 | 10/1972 | Fed. Rep. of Germany | 280/79.3 |
| 7807246 | 8/1978 | Fed. Rep. of Germany | |
| 322378 | 7/1957 | Switzerland | |
| 746995 | 3/1956 | United Kingdom | |
| 1455551 | 11/1976 | United Kingdom | |

Primary Examiner—David M. Mitchell
Attorney, Agent, or Firm—Martin A. Farber

[57] ABSTRACT

A mobile container, particularly for the storing of tools and workpieces, preferably in automobile repair shops, having a container bottom part which is provided with wheels and on which at least two guide columns are arranged for the mounting of a cover plate which can be secured in its uppermost position by a locking device and which is connected by flexible pull elements, preferably chains or ropes, with at least one tray arranged in such a manner that the latter is lifted off from the bottom part of the container when the cover plate is locked in its uppermost position. In order to facilitate the handling of such a container upon its opening and closing, at least one additional tray can be locked by an additional locking device in an intermediate position on the guide columns. This additional tray can be arranged either between the cover plate and a tray connected by flexible pull elements to the cover plate or else between the bottom part of the container and the lowermost tray which is connected by flexible pull elements to the cover plate.

5 Claims, 12 Drawing Figures

MOBILE CONTAINER

The present invention relates to a mobile container, particularly for the storing of tools and workpieces, preferably in automobile repair shops, having a container bottom part provided with wheels and on which at least two guide columns are arranged for the supporting of a cover plate which can be fixed in its uppermost position by a locking device and which is so connected via flexible pull elements, preferably chains or ropes, with at least one tray that when the cover plate is fixed in the uppermost position the tray is lifted off from the bottom part of the container.

Mobile containers which are also known as tool, material or installation carts are known in various embodiments. While in one type of mobile container the cover plate is held at a given distance from the bottom part of the container by fixed side-wall parts so that the storage space of the container which is subdivided by trays extends between the bottom of the bottom part of the container and the cover plate, in a second type of mobile container the cover plate and at least one tray are supported for vertical movement on at least two guide columns. In this way while the storage volume of the container is reduced when the tray and the cover plate are lowered onto the bottom part of the container, this amount of space is however sufficient in many cases to receive tools and workpieces so that this type of mobile container has met with particularly great acceptance in actual practice.

The invention starts out from a mobile container of the above-described type in which at least two guide columns for support of the cover plate are arranged on the bottom part of the container, which is provided with wheels, the cover plate being capable of being fixed in its uppermost position by a locking device and being connected via flexible pull elements, preferably chains, to at least one tray in such a manner that the tray is lifted from the container part when the cover plate is in the uppermost position. In this opened position of the mobile container not only is the bottom part of the container accessible but the tray, which is developed in trough-shape to receive tools and work pieces, is also accessible. When the cover plate is raised for instance to table height it can serve also for the placing of tools and workpieces on it and can be used at the same time as a work surface.

Since with such a mobile container one or two trays which at the same time serve to receive tools or workpieces must be lifted together with the cover plate due to the fact that they are connected to the cover plate by chains, when the mobile container is to be brought into the position of use, the operator must overcome a considerable weight upon the raising and lowering of the cover plate. Experience has shown that there is involved here weights on the order of 30 kg. which must be raised to approximately table height or lowered from this table height. The opening and closing of such mobile containers thus requires a considerable amount of physical exertion which, due to the stooped and forwardly bent position of the operator, stresses the spinal column in particular and therefore cannot be carried out by operators suffering from disc trouble.

It is the object of the present invention, while retaining the advantages of mobile containers of the above-mentioned type, to facilitate the opening and closing thereof.

The solution to this problem which is provided by the invention is characterized by the fact that at least one additional tray can be fixed by an additional locking device in an intermediate position on the guide columns.

By this development pursuant to the invention not only is the result obtained that the weight of the tray which is connected to the cover plate can be raised and lowered separately from the weight of the other tray, but the additional advantage is also obtained that—depending on the type of construction—either the storage volume of one tray or the storage volume of the bottom part of the container can remain closed if only the cover plate with the tray suspended from it is lifted into the uppermost position. In this way it is possible, for instance, to keep expensive tools locked within the tray or in the bottom part of the container even though a part of the storage volume of the mobile container is open and the cover plate can be used as resting and working surface when it is lifted to table-height.

In accordance with another feature of the invention, the additional tray can be arranged between the cover plate and a tray which is connected to the cover plate by flexible pull elements. In this embodiment, the tray suspended from the cover plate can remain closed by the additional tray which rests on it even though the cover plate has been lifted into the uppermost position. Furthermore, it is possible to secure only the additional tray, via its locking device, in an intermediate position on the guide columns, the cover plate resting on this tray. In this position, the tray suspended from the cover plate can rest on the bottom part of the container so that the closing of the bottom part of the container is possible with a reduced working height of the cover plate.

In another possible embodiment of the invention, the additional tray is arranged between the bottom part of the container and the lowermost tray, which is connected by flexible pull elements with the cover plate. In this embodiment also the weight to be overcome upon the opening and closing is divided up into two movements which are effected independently of each other. Furthermore, there is the possibility of keeping the bottom part of the container closed by the tray which rests upon it, even though the cover plate together with the tray suspended from it has been lifted into its uppermost position.

Two preferred embodiments of the mobile container of the invention are shown in the drawing in different positions of the cover plate and the trays.

Figure 1:
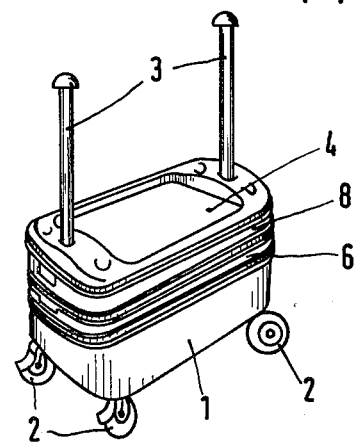
FIG. 1 is a perspective view of a first embodiment, shown in completely closed condition.

In both embodiments shown in the drawing the mobile container has a tank-shaped container-bottom part 1 which is open on the top and has four wheels 2 provided on it. In the longitudinal center of the bottom part 1 of the container, two guide columns 3 are fastened to the floor thereof, said columns extending vertically upwardly parallel to each other. These guide columns 3 can be attached permanently or removably to the bottom part 1 of the container and may have any desired cross section which is suitable for the carrying out of their guide functions.

On these guide columns 3 a cover plate 4 is mounted for vertical displacement, it being adapted to be locked in its uppermost position by a locking device. In the diagrammatic longitudinal sections, spring-biased pins 5 are shown as locking device, being mounted on the cover plate 4 and engaging into upper holes 3a in the guide columns 3 when the cover plate 4 is in its uppermost position.

In the first embodiment, shown in FIGS. 1 to 8, a tray 6 is connected by flexible pull elements to the cover plate 4, said elements comprising two chains in the embodiment shown. The length of these chains 7 is such that the tray 6 is at a predetermined distance above the bottom part 1 of the container when the cover plate 4 is secured to the guide columns 3 in its uppermost position.

Between the cover plate 4 and the tray 6 another tray 8 is displaceably mounted on the guide columns 3, this tray having a locking device in the form of two locking pins 9. By means of these locking pins 9 the tray 8 can be held fast in an intermediate position on the guide columns 3, this position being approximately midway between the uppermost position of the cover plate 4 and the tray 6 which is suspended from said cover plate 4. At this place a hole 3b is provided in the center of each guide column 3. The diameter of the locking pins 9 and of the central holes 3b is smaller than the diameter of the upper holes 3a and of the pins 5 so that the pins 5 cannot engage into the central holes 3b of the guide columns 3 which are intended for the locking pins 9.

Figure 2:
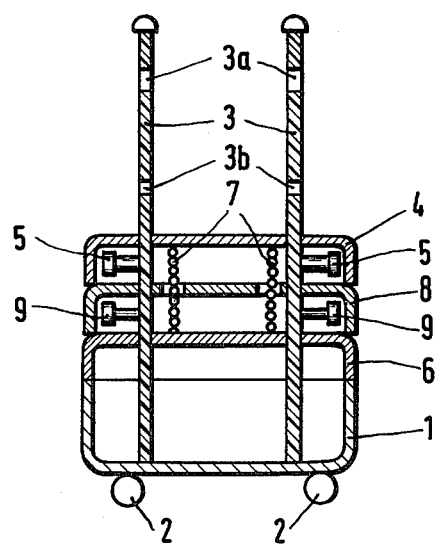
FIG. 2 is a diagrammatic longitudinal section through the mobile container of FIG. 1.

FIGS. 1 and 2 show the mobile container in its closed condition. The two trays 6 and 8 and the cover plate 4 all rest on each other and on the bottom part of the container so that, by the closing of these parts into the position shown in FIGS. 1 and 2 the storage volume of the container is protected from access.

Figure 3:
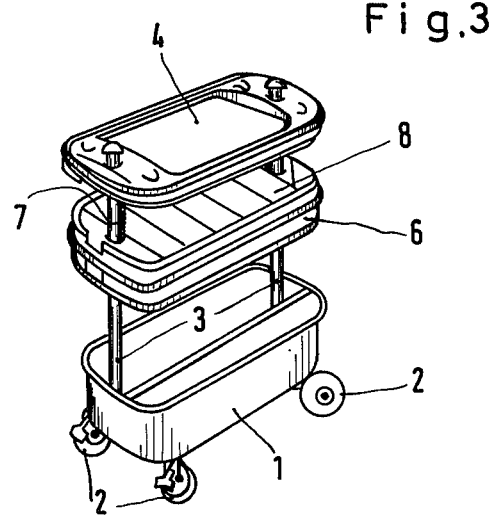
FIG. 3 is a perspective view of the mobile container of FIG. 1 with the cover plate raised into the uppermost position and with one tray closed by another tray.
Figure 4:
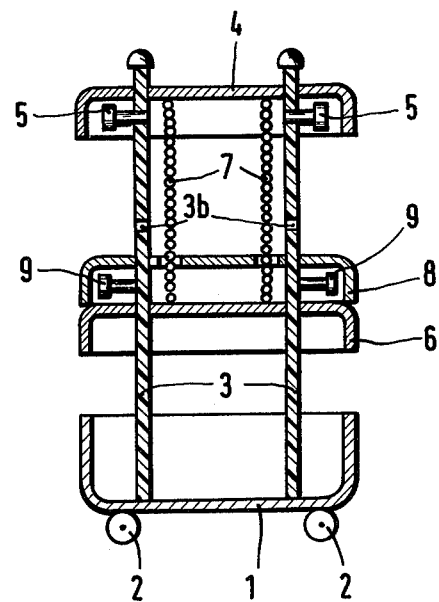
FIG. 4 is a diagrammatic longitudinal section through the mobile container of FIG. 3.

When the mobile container is to be opened, the cover plate 4 which is displaceably mounted on the guide columns 3 is lifted as shown in FIGS. 3 and 4 until the pins 5 engage into the upper holes 3a of the guide columns 3. Upon this lifting of the cover plate 4, the tray 6 as well as the tray 8 which lies on said tray 6 are carried along via the chains 7. There is obtained the situation shown in FIGS. 3 and 4 in which the bottom part of the container is accessible by the raising of the tray 6. The articles present on the tray 8 can also be removed, while the storage space of the tray 6 is not accessible due to the fact that the tray 8 is lying on it. The trays 6 and 8 can be fastened together, for instance by a lock.

Figure 5:
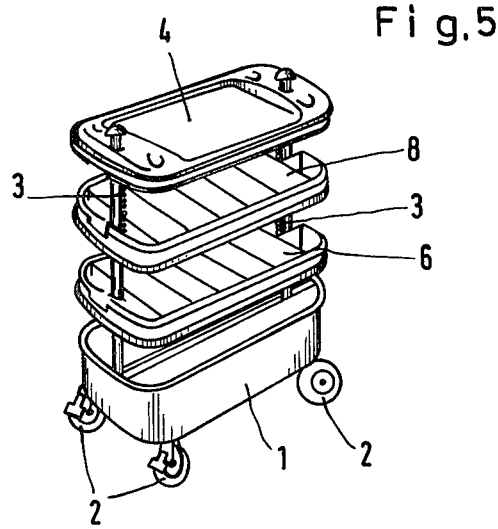
FIG. 5 is a perspective view of the mobile container of FIGS. 1 and 3 shown completely open as a result of the lifting of the additional tray into an intermediate position.
Figure 6:
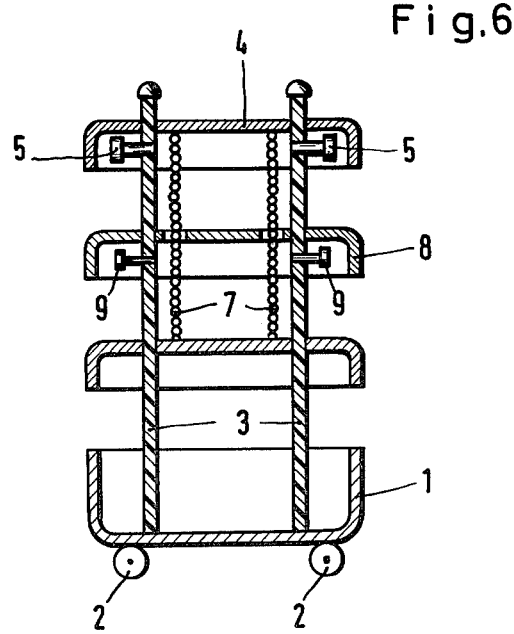
FIG. 6 is a diagrammatic longitudinal section through the open container shown in FIG. 5.

In order to obtain access also to the articles placed in the tray 6, it is necessary, in accordance with FIGS. 5 and 6, to lift the tray 8, which is not connected to the cover plate 4 and through which the chains 7 pass freely, into its intermediate position. In this intermediate position the locking pins 9 engage into the central holes 3b of the guide columns 3. All parts of the mobile container are now accessible.

Figure 7:
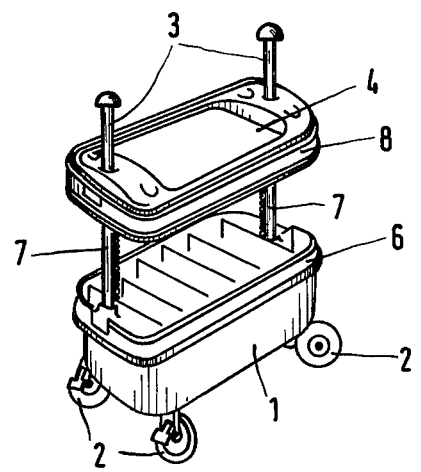
FIG. 7 is a perspective view of the mobile container of FIGS. 1, 3 and 5 with the tray lifted into its intermediate position and cover plate resting on said tray.
Figure 8:
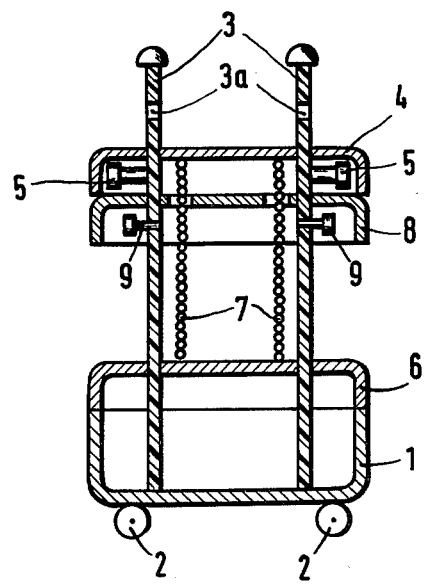
FIG. 8 is a diagrammatic longitudinal section through the mobile container of FIG. 7.

If the weight of the articles placed on the tray 8 is too great to lift said tray 8 together with the weight of the tray 6, then, in accordance with FIGS. 7 and 8, the tray 8 is first of all lifted into its intermediate position in which the locking pins 9 engage into the central holes 3b of the guide columns 3. While upon this lifting of the tray 8 into its intermediate position the weight of the cover plate and of the chain 7 is also lifted it is true, these parts have only a little weight. As can be noted in particular from FIG. 8, the tray 6 which hangs via the chain 7 from the cover plate 4 remains in its position resting on the bottom part 1 of the container when the cover plate 4 resting on the tray 8 is lifted in the manner described above. The tray 6 and the weight lying in it are only then moved when, after the locking of the tray 8 to the guide columns 3, the cover plate 4 is lifted into its uppermost position, shown in FIGS. 5 and 6, in which the pins 5 engage into the upper holes 3a of the guide column 3.

In this way it is possible to lift the weight of the tray 6, together with the material present in it, only after the lifting of the tray 8 and independently of the latter so that a splitting up of the lifting process can be effected in the case of heavy workpieces or tools. Furthermore the lowering of the trays 6 and 8, which is disagreeable and difficult in the case of heavy weights, can be effected in the manner described above, but in the reverse sequence.

As shown in FIGS. 7 and 8, it is furthermore possible to leave the cover plate 4 together with the tray 6 in the middle position. In this position the tray 6 closes off access to the bottom part 1 of the container and the cover plate 4 closes off access to the tray 8 so that only the contents of the tray 6 are accessible when the parts 4 and 8 and 6 and 1 respectively are fastened together, for instance by a lock. Even in the middle position shown in FIGS. 7 and 8 the cover plate can also be used as resting or work surface since the securing of the tray 8 to the guide columns 3 is sufficient to assure the required stability of the cover plate 4.

The second embodiment, shown in FIGS. 9 to 12, corresponds in its basic construction to the embodiment shown in FIGS. 1 to 8. It differs from the first embodiment by the fact that the tray 8 which is not connected to the cover plate 4 is arranged on the guide columns 3 below the tray 6, the latter which is connected by chains 7 to the cover plate 4.

Figure 9:
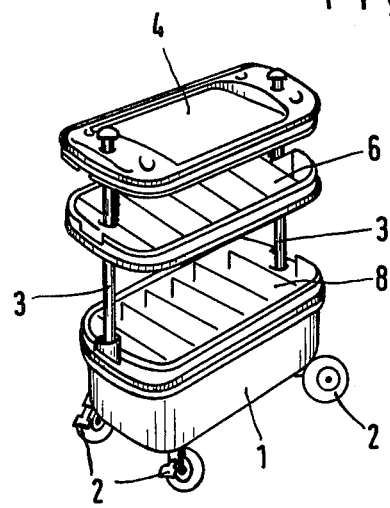
FIG. 9 is a perspective view of a second embodiment with the cover plate lifted into the uppermost position, another tray, not connected with the cover plate, resting on the bottom part of the container.
Figure 10:
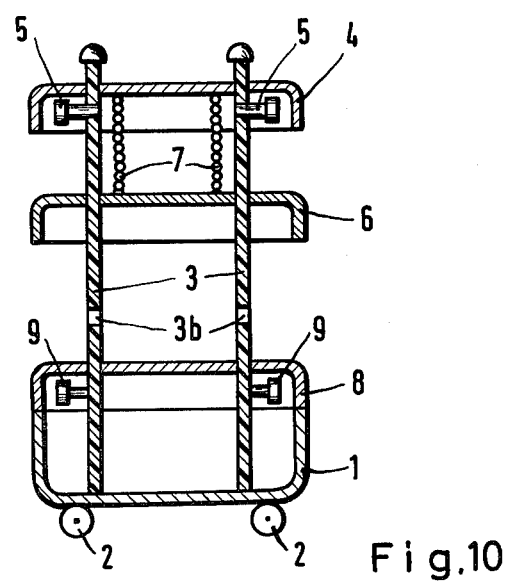
FIG. 10 is a diagrammatic longitudinal section through the mobile container of FIG. 9.

In this embodiment the cover plate 4, and with it the tray 6 connected by the chains 7, is first of all lifted until the pins 5 engage into the upper holes 3a of the guide columns 3. This is shown in FIGS. 9 and 10. In this position the other tray 8, which is independent of the cover plate 4, is still on the bottom part 1 of the container so that the latter can be kept closed if necessary.

Figure 11:
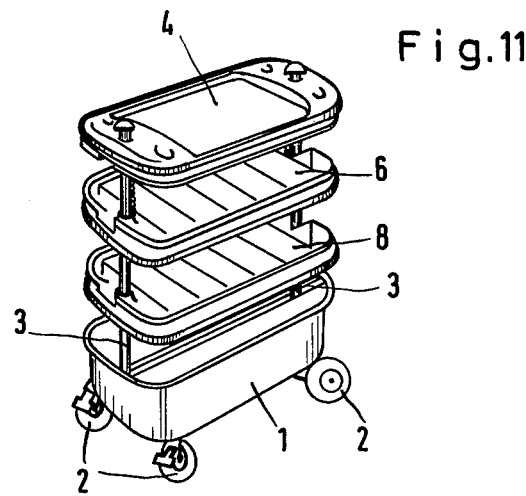
FIG. 11 is a perspective view of the mobile container of FIG. 9 with the tray locked in its raised intermediate position.
Figure 12:
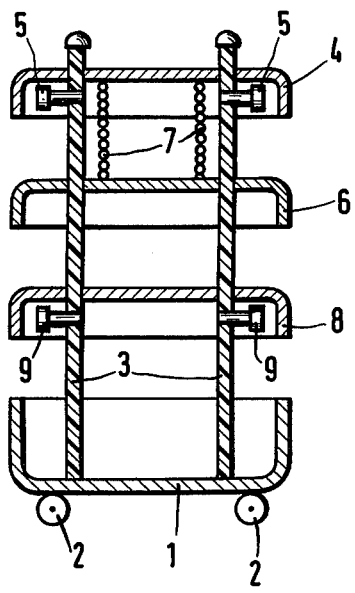
FIG. 12 is a diagrammatic longitudinal section through the mobile container of FIG. 11.

Only after the lifting of cover plate 4 and tray 6 into the position shown in FIGS. 9 and 10 is the tray 8 lifted so far that its locking pins 9 can engage into the center holes 3b of the guide columns 3, as shown in FIGS. 11 and 12. In this embodiment also therefore the weight is split up during the lifting and lowering of the trays 6 and 8. The possibility of only partially opening the mobile container despite the fact that its cover plate 4 is in the uppermost position is also present if the tray 8, as shown in FIGS. 9 and 10, remains in the lower position on the bottom part 1 of the container.

I claim:

1. In a mobile container, particularly for the storing of tools and workpieces, preferably in automobile repair shops, having a container bottom part provided with wheels and on which at least two guide columns are arranged for the supporting of a cover plate displaceable thereon which can be fixed in an uppermost position thereof by means of a locking device and which is connected via flexible pull elements with at least one tray in such a manner that when the cover plate is fastened in the uppermost position said tray is lifted, the improvement comprising at least one additional tray displaceably mounted on the guide columns, means comprising an additional locking device for securing said at least one additional tray in an intermediate position on the guide columns, said at least one additional tray is arranged between said cover plate and said at least one tray.

2. In a mobile container, particularly for the storing of tools and workpieces, preferably in automobile repair shops, having a container bottom part provided with wheels and on which at least two guide columns are arranged for the supporting of a cover plate displaceable thereon which can be fixed in an uppermost position thereof by means of a locking device and which is connected via flexible pull elements with at least one tray in such a manner that when the cover plate is fastened in the uppermost position said tray is lifted off from the bottom part of the container, the improvement comprising at least one additional tray displaceably mounted on the guide columns, means comprising an additional locking device for securing said at least one additional tray in an intermediate position on the guide columns, said flexible pull elements freely extend through said at least one additional tray.

3. In a mobile container, particularly for the storing of tools and workpieces, preferably in automobile repair shops, having a container bottom part provided with wheels and on which at least two guide columns are arranged for the supporting of a cover plate displaceable thereon which can be fixed in an uppermost position thereof by means of a locking device and which is connected via flexible pull elements with at least one tray in such a manner that when the cover plate is fastened in the uppermost position said tray is lifted off from the bottom part of the container, the improvement comprising at least one additional tray displaceably mounted on the guide columns, means comprising an additional locking device for securing said at least one additional tray in an intermediate position on the guide columns, said guide columns are formed with uppermost openings engageable by said locking device and intermediate openings engageable by said additional locking device, said uppermost openings and a cooperatively engageable part of said locking device are larger than said intermediate openings and a cooperatively engageable part of said additional locking device.

4. The container as set forth in claim 3, wherein said at least one additional tray is arranged between said cover plate and said at least one tray.

5. The container as set forth in claim 3, wherein said flexible pull elements freely extend through said at least one additional tray.

* * * * *